United States Patent [19]

Minor

[11] 3,890,097
[45] June 17, 1975

[54] METHOD OF PURIFYING WET PROCESS PHOSPHORIC ACID

[75] Inventor: John T. Minor, Ponca City, Okla.

[73] Assignee: Agrico Chemical Company, Tulsa, Okla.

[22] Filed: May 6, 1974

[21] Appl. No.: 467,265

[52] U.S. Cl. .............. 23/300; 423/321; 23/296
[51] Int. Cl. ............................................. B01d 9/00
[58] Field of Search ........... 423/320, 321, 321 S; 23/296, 297, 295, 300

[56] References Cited
UNITED STATES PATENTS

| | | | |
|---|---|---|---|
| 1,283,398 | 10/1918 | Carothers et al. | 23/295 |
| 1,451,786 | 4/1923 | Ross et al. | 423/321 S |
| 2,847,285 | 8/1958 | Pahud | 23/295 |
| 2,987,053 | 7/1959 | Suanog | 23/296 |
| 3,044,854 | 7/1962 | Young | 423/320 |
| 3,284,174 | 11/1966 | Harper | 23/301 |
| 3,679,374 | 7/1972 | Kovacs | 23/297 |

FOREIGN PATENTS OR APPLICATIONS 44-41692   1969   Japan ................................ 423/321

Primary Examiner—Edward J. Meros
Assistant Examiner—Eugene T. Wheelock
Attorney, Agent, or Firm—Richards, Harris & Medlock

[57] ABSTRACT

The present invention relates to a method of purifying wet process phosphoric acid wherein the phosphoric acid solution is diluted with sulfuric acid, the diluted acid solution is cooled to a temperature effective to cause crystallization of a portion thereof, and the crystalline portion is separated and melted to obtain the purified phosphoric acid solution.

8 Claims, 1 Drawing Figure

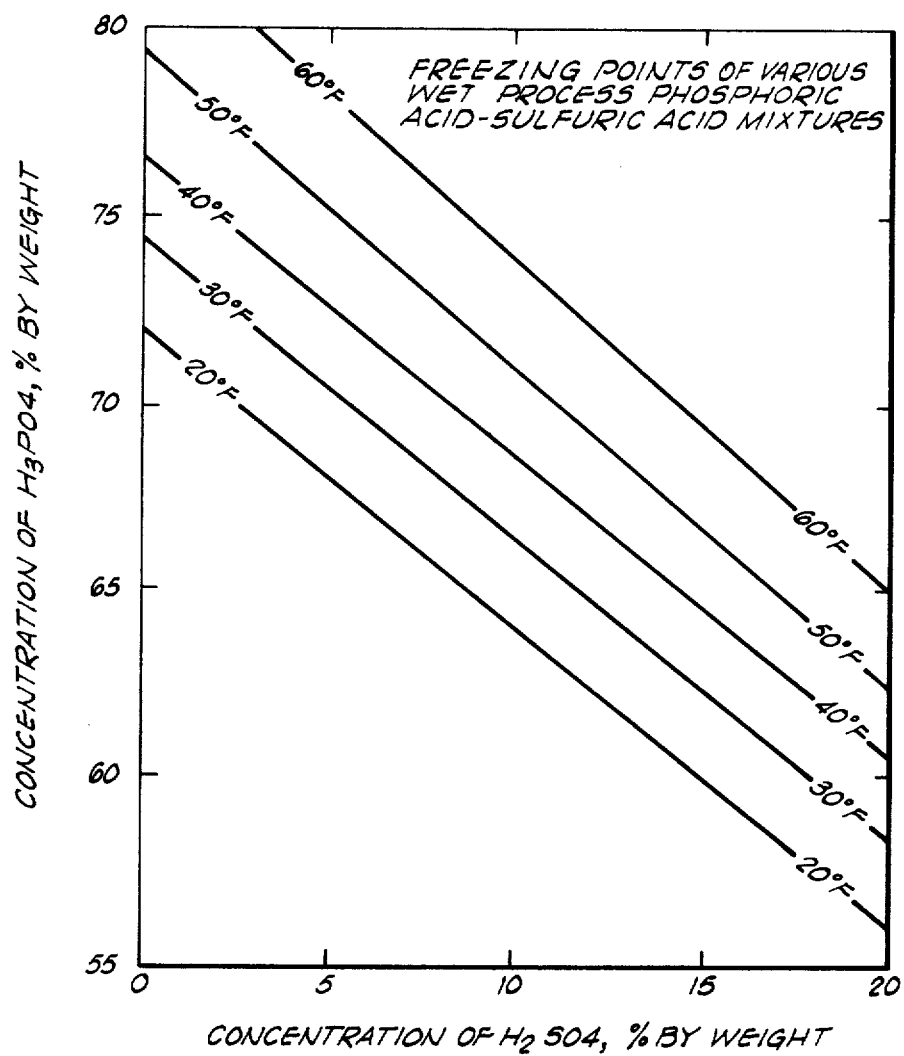

METHOD OF PURIFYING WET PROCESS PHOSPHORIC ACID

BACKGROUND OF THE INVENTION

1. Field of the Invention:

The present invention relates to an improved method of purifying wet process phosphoric acid, and more particularly, but not by way of limitation, to a method of purifying wet process phosphoric acid by crystallization.

2. Brief Description of the Prior Art:

Wet process phosphoric acid is prepared by treating phosphate rock with dilute sulfuric acid, and contains a variety of impurities. That is, acid soluble impurities which are present in the phosphate rock are present in the acid solution produced therefrom. Impurities which are almost always present are soluble iron, aluminum, magnesium, and calcium salts. The presence of such impurities in combination with the high viscosity of wet process phosphoric acid make it difficult to utilize as a process starting material.

Heretofore, various methods for purifying wet process phosphoric acid have been proposed such as fractional distillation, etc. However, these methods generally require elaborate equipment to carry out. By the present invention an improved method of purifying wet process phosphoric acid is provided which is relatively simple and which may be carried out relatively economically.

SUMMARY OF THE INVENTION

The present invention is directed to a method of purifying wet process phosphoric acid which comprises combining a quantity of sulfuric acid with the wet process phosphoric acid so that the viscosity of the combined solution is lowered and the freezing point thereof raised, cooling the combined solution to a temperature below its freezing point so that a portion thereof is crystallized, separating the crystalline portion from the remaining liquid portion of the solution and then melting the crystalline portion to obtain a purified phosphoric acid solution.

It is, therefore, a general object of the present invention to provide a method of purifying wet process phosphoric acid.

A further object of the present invention is the provision of an improved method of purifying wet process phosphoric acid which is relatively simple and economical to carry out as compared to prior art methods.

Another object of the present invention is the provision of a method of purifying wet process phosphoric acid whereby it may be utilized as a process starting material without encountering problems associated with the unpurified acid such as high viscosity and the formation of impurity precipitates.

Other and further objects, features and advantages will be apparent from the following description of preferred embodiments of the invention, given for the purpose of disclosure.

BRIEF DESCRIPTION OF THE DRAWING

The drawing is a graph of the freezing points of wet process phosphoric acid-sulfuric acid mixtures.

DESCRIPTION OF THE PREFERRED EMBODIMENTS

This invention provides a method of purifying, i.e., improving the color, purity, and concentration, of wet process phosphoric acid. The term "wet process phosphoric acid" is well-known to those skilled in the art and is used herein to mean the phosphoric acid solution produced by treating phosphate rock with dilute sulfuric acid. Such wet process acid is commonly commercially available at what is known in the art as "merchant acid strength". Merchant strength wet process phosphoric acid is generally the most economical wet process phosphoric acid solution commercially available, and may be comprised of 75 percent by weight phosphoric acid, 3 percent by weight sulfuric acid and 22 percent by weight water and impurities, and typically will contain 71–76 percent by weight phosphoric acid and 3–6 percent by weight sulfuric acid with the balance consisting of water and impurities.

As previously mentioned, wet process phosphoric acid usually contains impurities in the form of soluble salts of iron, aluminum, magnesium and calcium, which impurities cause the phosphoric acid solution to be discolored and often black. Unpurified wet process phosphoric acid has heretofore been utilized as a starting material in the production of various phosphate compounds. For example, merchant strength wet process phosphoric acid is commonly utilized to produce sodium tripolyphosphate, a salt which is in turn utilized in detergent formulations. The unpurified wet process acid is difficult to use in that it is highly viscous, and when a base is added to the acid, as for example to produce the intermediate salt from which sodium tripolyphosphate is derived, impurity precipitates are formed which require separation, etc. By the present invention, a method is provided for purifying wet process phosphoric acid wherein the color, purity and concentration of the acid are improved. The present invention basically comprises combining a quantity of sulfuric acid with the wet process phosphoric acid solution, preferably in an amount sufficient to raise the concentration of sulfuric acid in the solution from about 10 percent by weight to about 15 percent by weight. The addition of the sulfuric acid to the impure wet process phosphoric acid solution lowers the viscosity of the solution and increases the freezing point thereof. The combined phosphoric acid-sulfuric acid solution is then cooled to a temperature below the freezing point thereof, preferably to a temperature about 25° F. below the freezing point, so that a portion of the solution is crystallized or frozen. The crystalline material, which comprises approximately 50 percent of the phosphoric acid present in the solution, is separated from the remaining liquid in a conventional manner such as by filtration or centrifugation. The separated crystalline portion of the solution is then melted to produce the purified phosphoric acid solution.

As mentioned above the addition of the sulfuric acid to the wet process phosphoric acid achieves the dual function of raising the freezing point of the solution and lowering the viscosity thereof. This is highly advantageous in that it allows the crystallized phosphoric acid to be removed from the remaining liquid by conventional methods. Heretofore, crystallization of wet process phosphoric acid has been impractical because of the high viscosity of the mother liquor at the low temperatures required. Further, prior to the present invention, it was found that the crystal growth in wet process phosphoric acid is slow and washing of crystals formed very difficult.

In a preferred technique for carrying out the method of the present invention, a 10 percent by weight aqueous sulfuric acid solution is added to wet process phosphoric acid of merchant acid strength in an amount sufficient to increase the concentration of sulfuric acid from 3 percent by weight to between about 10 percent and 15 percent by weight. The resulting concentration of phosphoric acid in the solution is from about 65 percent to 70 percent by weight. Referring to the drawing, it may be seen that the freezing point of wet process phosphoric acid of merchant acid strength (75 percent by weight $H_3PO_4$ and 3 percent by weight $H_2SO_4$) is 43° F. The freezing point of the same phosphoric acid solution after the addition of a 10 percent by weight aqueous sulfuric acid solution thereto to increase the sulfuric acid concentration to 11.8 percent by weight and decrease the phosphoric acid concentration to 68.2 percent by weight is increased to 48° F. Further, the viscosity of the wet process phosphoric acid at merchant acid strength is 127 centipoises at 48° F. while the viscosity of the acid solution diluted with sulfuric acid is decreased to 112 centipoises at 48° F. The foregoing is contrasted with a wet phosphoric acid solution which has been diluted with water to the same phosphoric acid concentration, i.e., 68.2 percent by weight, to lower the viscosity. The sulfuric acid concentration of such a solution is 2.7 percent by weight, and the freezing point of the solution is 10° F. If the temperature of the water diluted solution is lowered below the freezing point thereof (10° F.), the viscosity of the mother liquor is extremely high making separation of crystalline material formed from the mother liquor extremely difficult.

In order to present a clear understanding of the method of the present invention, the following examples are given:

EXAMPLE 1

Wet process phosphoric acid of merchant acid strength was diluted with an aqueous 10 percent by weight sulfuric acid solution such that the final concentration of the solution was 67.5 percent by weight phosphoric acid and 13.5 percent sulfuric acid. The temperature of the solution was then lowered to 20° F. and maintained at 20° F. for several hours. The resultant slurry was filtered and the solid crystalline portion pulled dry on a filter funnel. Analyses of the crystalline portion produced and the remaining liquid portion are as follows:

| COMPONENT | CONCENTRATION (WEIGHT %) | |
| --- | --- | --- |
| | Crystalline Portion | Liquid Portion |
| Phosphoric Acid | 80.3 | 58.5 |
| Fe | 0.44 | 1.41 |
| Al | 0.32 | 0.94 |
| Mg | 0.12 | 0.35 |
| Ca | 0.01 | 0.016 |

From the above it may be seen that the concentration of phosphoric acid in the crystalline portion was increased while the concentration of impurities was decreased.

EXAMPLE 2

406 grams of the sulfuric acid diluted wet process phosphoric acid solution described above (67.5 percent by weight phosphoric acid and 13.5 percent by weight sulfuric acid) was frozen with seeding by lowering the temperature thereof to 20° F. After maintaining the solution at 20° F. for a period of time sufficient to establish equilibrium, the resulting slurry was filtered and 163 grams of purified phosphoric acid was obtained. The purified acid amounted to 40 percent by weight of the solution and 51 percent by weight of the phosphoric acid. About 10 percent by weight of the product was lost by washing with 70 grams of 78 percent reagent grade phosphoric acid at 20° F. The purified, washed acid was vastly improved in color as compared to the original black color of the wet process acid solution. Analysis of the purified washed acid is as follows:

| COMPONENT | CONCENTRATION (WEIGHT %) |
| --- | --- |
| $H_3PO_4$ | 86.30% |
| $H_2SO_4$ | 1.10% |
| Fe | 0.11% |
| Al | 0.10% |
| Mg | 0.04% |
| Ca | 0.01% |

Thus, the present invention is well adapted to carry out the objects and attain the ends and advantages mentioned as well as those inherent therein. While certain preferred embodiments of the invention have been described hereinbefore in order to provide examples of the manner in which the invention may be practiced sufficient for use by those of ordinary skill in the art, variations may be made without departing from the spirit of the invention as defined by the appended claims.

What is claimed is:

1. A method of purifying merchant strength wet process phosphoric acid having, by weight, about 71 percent to 76 percent phosphoric acid and 3 percent to 6 percent sulfuric acid which comprises the steps of:
   combining a quantity of sulfuric acid with said wet process phosphoric acid to raise the sulfuric acid concentration to a value between about 10 and 20 percent, by weight, so that the viscosity of the combined solution is lowered and the freezing point thereof raised;
   cooling the combined phosphoric acid solution to a temperature below the freezing point thereof so that a portion of the solution is crystallized;
   separating the crystalline portion from the remaining liquid portion of said solution; and
   melting the separated crystalline portion to obtain purified phosphoric acid solution.

2. The method of claim 1 wherein the sulfuric acid combined with said wet process phosphoric acid is a 10 percent by weight aqueous sulfuric acid solution.

3. The method of claim 2 wherein said sulfuric acid solution is combined with said wet process phosphoric acid in an amount sufficient to obtain a combined solution having a sulfuric acid concentration of from about 10 percent by weight to about 15 percent by weight.

4. The method of claim 2 wherein the combined solution is cooled to a temperature which is about 25° F. below the freezing point of the solution.

5. A method of purifying wet process merchant grade phosphoric acid solution prepared by treating phosphate rock with dilute sulfuric acid which produces a solution having about, by weight, 71 to 76 percent phosphoric acid and 3 to 6 percent sulfuric acid which comprises the steps of:

diluting the wet process phosphoric acid solution produced with an additional quantity of dilute sulfuric acid to produce a solution having from about 10 to 20 percent sulfuric acid, by weight, so that the viscosity of the solution is lowered and the freezing point thereof raised;

cooling the diluted solution to a temperature below the freezing point thereof so that a portion of the solution is crystallized;

separating the crystalline portion from the remaining liquid portion of said solution; and melting the crystalline portion to obtain a purified wet process phosphoric acid solution.

6. The method of claim 5 wherein the sulfuric acid combined with said wet process phosphoric acid is a 10% by weight aqueous sulfuric acid solution.

7. The method of claim 6 wherein the wet process phosphoric acid solution is diluted with said sulfuric acid solution in an amount sufficient to raise the sulfuric acid concentration in said solution to from about 10 percent by weight to about 15 percent by weight.

8. The method of claim 7 wherein the combined solution is cooled to a temperature which is about 25° F. below the freezing point of the solution.

* * * * *